United States Patent Office 3,145,237
Patented Aug. 18, 1964

3,145,237
POLYNUCLEAR AROMATIC COMPOUNDS
Robert van Helden, Govert Verberg, and Bob Balder, Amsterdam, Netherlands, assignors to Shell Oil Company, New York, N.Y., a corporation of Delaware
No Drawing. Filed Dec. 13, 1962, Ser. No. 244,285
Claims priority, application Netherlands Dec. 22, 1961
12 Claims. (Cl. 260—670)

This invention relates to the production of polynuclear aromatic compounds having aromatic nuclei directly linked to one another by nuclear carbon to nuclear carbon bond. A more particular aspect of the invention relates to the production of diphenyl and/or substituted diphenyl type compounds by catalytic coupling of benzene and/or substituted benzenes.

In accordance with the present invention aromatic compounds having at least one labile hydrogen atom attached to a carbon atom of an aromatic nucleus are reacted, in liquid phase, with a salt of a metal of the palladium or platinum group with an acid selected from the mineral acids, aliphatic monocarboxylic acids and sulfonic acid, under substantially anhydrous conditions, at a temperature of from about 40° to about 200° C., in the presence of an acid acceptor or buffering agent selected from the group consisting of oxides and salts of the alkali metals and the alkaline earth metals, thereby effecting intermolecular condensation of aromatic nuclein in said aromatic compounds with the formation of a reaction mixture comprising polyaryl compounds wherein aromatic nuclei are directly linked by nuclear carbon to nuclear carbon bond. In one embodiment of the invention benzene and/or substitued benzenes are coupled to yield reaction mixtures comprising condensation products of the type of diphenyl and/or substituted diphenyl.

Aromatic compounds used as starting materials in the process of the invention comprise broadly the compounds containing one or more rings of aromatic character containing a labile hydrogen atached to a carbon atom in the aromatic nucleus. The suitable charge materials comprise compounds having a single or a plurality of such nuclei of aromatic character. When more than one nucleus of aromatic character is present in the compound, they may be present as condensed ring structures or as non-condensed structures. The suitable compounds may furthermore comprise both aromatic nuclei of condensed and of non-condensed ring structure.

Suitable aromatic charge materials comprise, for example, the aromatic hydrocarbons such as benzene, the alkyl-substituted benzenes such as toluene, xylene, cumene, ethyl benzene, dimethyl benzene and the like, diphenyl, naphthalene, terephenyl, etc. Suitable charge materials containing a nucleus of aromatic character include heterocyclic compounds wherein the heteroatom is nitrogen, such as pyridine and alkyl substituted pyridines. The aromatic nucleus may have directly attached thereto substituent groups such as hydrocarbyl groups, for example, alkyl groups and other substituents which do not enter into reaction to any substantial degree and which do not adversely affect the desired condensatoin reaction. Desirable charge materials comprise those wherein the substituent groups attached to the aromatic nucleus are, for example, halogen, preferably chlorine or bromine, alkoxy groups, phenoxy groups, alkoxyalkyl groups, hydroxyl groups, carboxyl groups, amino groups, ester groups, and the like.

The aromatic charge to the process of the invention may cmprise a single aromatic compound or a mixture of any two or more of the aromatic compounds of the above-defined class.

Further specific but non-limitng examples of suitable materials employed as charge to the process of the invention comprise: anisole, diphenyl oxide, chlorobenzene, phenyl acetate, the methyl ester of beta-phenyl-beta, beta-dimethylpropionic acid, N,N-dimethylaniline, and the like.

The aromatic charge to the process of the invention need not be pure and may comprise lesser amounts of components, for example, hydrocarbons which are either inert under the reaction conditions, or which do not interfere to any substantial degree with the desired condensation reaction. Suitable aromatic charge comprises the commercially available unsubstituted and substituted aromatic hydrocarbons. The charge to the process may, if desired, be subjected to suitable conventional purifying or treating conditions to effect the removal of undesired constituents therefrom prior to subjection to the process of the invention.

Metals of the palladium and platinum groups, salts of which are reacted with the aromatic charge in the process of the invention include ruthenium, rhodium, palaldium, osmium, iridium, and platinum. Of these, palladium, platinum, rhodium and iridium are preferred. Suitable salts of these metals comprise their salts with a mineral acid or with a carboxylic acid. These include, for example, the halides, particularly the chlorides, sulfates, and nitrates, as well as their salts with sulfonic acids, carboxylic acids, particularly the acids of the lower aliphatic monocarboxylic acids such as acetic acid, propionic acid, and the like. Palladium dichloride is found to be particularly effective. The use of a single one, or two or more of such salts, may be employed as charge to the reaction.

The process of the invention is preferably carried out in a substantially anhydrous liquid medium. The presence of water in substantial amount is generally found to have an adverse effect upon the desired reaction.

The process is preferably executed in the presence of a suitable liquid medium. Suitable media comprise relatively inert, highly polar compounds, for example: carboxylic acids, particularly the lower aliphatic monocarboxylic acids such as acetic acid, propionic acid, pivalic acid, etc., as well as benzoic acid; ketones, such as acetone, dimethyl ketone, ethyl methyl ketone, ethyl amyl ketone, etc.; esters such as alkyl esters of monocarboxylic acids, as ethyl acetate, etc.; amides, such as dimethyl formamide; nitriles, nitro compounds as nitroethane, etc. Suitable reaction media include broadly those compounds capable of functioning as solvents for one or more components of the charge, which are relatively inert under the reaction conditions and which are separated readily by conventional means from the resulting reaction mixtures.

Reaction of the aromatic charge with the salt of the metals of the palladium and platinum groups in accordance with the invention is carried out in the presence of an acid acceptor or a buffering agent. Such suitable components of the charge to the process comprise broadly compounds capable of binding any free mineral acid, or capable of functioning as a buffering agent, under the conditions of the process. Suitable for this purpose are, for example: the salts of the alkali and alkaline earth metals with an organic acid, such as their salts of monocarboxylic acids, benzoic acid, etc. Preferred are salts of a relatively strong base and a relatively weak acid such as, for example, the salts of sodium, calcium or lithium, with a monocarboxylic acid such as acetic acid, propionic acid, pivalic acid, butyric acid, or with an organic acid such as benzoic acid, phthalic acid, terephthalic acid, succinic acid, etc. Inorganic acid salts capable of functioning as acid acceptors or buffering agents may also be employed within the scope of the invention. Such suitable inorganic salts include, for example, di- and tri-sodium phosphate, borax, etc. If the reaction is carried out in a reaction medium other than an acid, materials such as the carbonates, bicarbonates, oxides, and the like, of the alkali metals and alkline earth metals, such as those of calcium and magnesium, for exmple, may suitably be used as acid-binding agents.

In a preferred embodiment of the invention the reaction is executed in the presence of a lower aliphatic monocarboxylic acid and an alkali metal salt of a lower aliphatic monocarboxylic acid, for example, acetic acid and sodium acetate. The presence of these materials, it has been found, has a decidedly advantageous effect upon the yield of the desired condensation product.

The reaction is carried out at a temperature in the range of from about 40 to about 200° C.; somewhat higher or lower temperatures may, however, be employed within the scope of the invention. The temperature preferably employed will be dependent to some extent upon the particular aromatic charge present. Temperatures in the range of from about 50 to about 150° C. are generally preferred. The process may be carried out at atmospheric, subatmospheric or superatmospheric pressures. In general, the pressure employed is sufficiently high to maintain at least a substantial part of the reaction mixture in the liquid phase.

Molecular oxygen, or an oxygen-containing gas, may be introduced into the system continuously or intermittently during the course of the process. The oxygen may be introduced as relatively pure oxygen or as a mixture of oxygen with a diluent gas. Air may suitably be employed. The partial pressure of oxygen so introduced may lie in the range of, for example, from about 0.1 to about 1 atmosphere. The presence of the oxygen, or oxygen-containing gas, has been found to exert a highly favorable effect upon the reaction. For example, when charging o-xylene, increased yields of 3,3',4,4'-tetramethyldiphenyl are obtained by passing oxygen through the reaction mixture.

The relative proportions in which the components of the charge are introduced into the reaction system may vary widely within the scope of the invention, depending to some extent upon the particular materials used and specific operating conditions employed. In general it has been found advantageous to employ the aromatic charge in excess with respect to the metal salt. Thus execution of the reaction with from about 5 to about 20 moles of aromatic charge per mole of metal salt is found satisfactory. The acid-binding or buffering agent is generally employed in an amount ranging, for example, from about one to about six, and preferably from about two to about five moles per mole of metal salt. Higher or lower proportions of the aromatic reactant, metal salt, and/or acid binding or buffering agent may, however, be used within the scope of the invention.

Under the above-defined conditions aromatic charge to the process is converted to reaction products comprising compounds containing a plurality of aromatic nuclei linked by nuclear carbon to nuclear carbon bonds. The process is applied advantageously to prepare compounds with twice as many aromatic nuclei in the molecule as the compounds used as starting material. However, when employing as charge compounds with unequal numbers of aromatic nuclei, odd numbers of nuclei can be formed in product compound. For example, benzene is readily coupled to diphenyl; when starting with a mixture of benzene and diphenyl one can prepare not only diphenyl and tetraphenyl but also terphenyl.

Without intent to limit in any wise the scope of the invention by theory advanced herein to set forth more fully the nature of the invention, it is believed that the over-all reaction, when coupling benzene in the presence of $PdCl_2$, may be assumed to be represented by the formulae:

$$2C_6H_6 + PdCl_2 \rightarrow C_6H_5\text{—}C_6H_5 + Pd + 2HCl$$

The acid being bound by the acid-binding material, this phase of the process may be assumed to be represented by the following when sodium acetate is used as acid-binding agent:

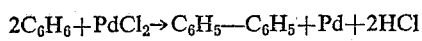

Illustrative of the production of polynuclear aromatic compounds from mononuclear aromatic charge, or of higher polynuclear aromatic compounds from lower polynuclear aromatic compounds, in accordance with the process of the invention, is the production of the polynuclear aromatic compounds listed in the following Table B from the similarly numbered aromatic compounds listed in Table A:

*Table A*

(1) Toluene
(2) Cumene
(3) Diphenyl
(4) Naphthalene
(5) Anisole
(6) Diphenyl oxide
(7) m-Xylene
(8) Chlorobenzene
(9) Phenyl acetate
(10) Methyl ester of beta-phenyl-beta,beta-dimethylpropionic acid
(11) N,N-dimethylaniline

*Table B*

(1) p,p'-Dimethyldiphenyl
(2) p,p'-Diisopropyldiphenyl
(3) n-Tetraphenyl
(4) Beta,beta-dinaphthyl
(5) p,p'-Dimethoxy-diphenyl
(6) p,p'-Diphenoxydiphenyl
(7) 3,3',5,5'-tetramethyldiphenyl
(8) p,p'-Dichlorodiphenyl
(9) p,p'-Diacetoxydiphenyl
(10) p,p'-Di(1,1'-dimethyl-2-carbomethoxyethyl)diphenyl
(11) N,N,N',N'-tetramethyldiaminodiphenyl A particular advantage of the process of the invention resides in its ability to provide an efficient route to the production of substituted polyfunctional aromatics from readily available aromatic charge. These products are of value in many important fields of application. They are suitable for use as starting materials or intermediates in the production of polymeric products, for example, materials of resinous character particularly suitable for use in the paint industry, and for the production of synthetic fibers in the textile industry. They are furthermore of value as starting and intermediate materials in the production of chemical derivatives including pharmaceuticals, dyes, etc.

During the course of the process the salts of the metals, employed as reactants, are reduced either partly or completely; the free metal generally being formed, which precipitates or is maintained in suspension in the reaction mixture. In some instances metal ions with lower valency are formed during the reduction.

The original metal salts can be regenerated from the reduced metal salts by subjection to oxidation conditions. Such regeneration can be carried out in situ, or in a separate zone of the process. If the metal salt is palladium dichloride, for example, palladium formed during the process is converted to the palladium salt by treating the metal with chlorine, in the presence of hydrochloric acid. A suitable method comprises contact of the reduced compound with oxygen, or an oxygen-containing gas, such as air, in the presence of the acid. This is preferably carried out in the additional presence of an oxidation catalyst, such as for example, one or more oxides of nitrogen; copper and/or iron salts also produce satisfactory results.

The desired polynuclear aromatic product, or products, are separated from the resulting reaction mixtures by conventional means which may comprise one or more of such steps as filtration, distillation, extractive distillation, solvent extraction, adsorptive separation, etc.

The following examples are illustrative of the invention:

Example I

A reaction vessel, provided with a stirrer and a reflux condenser, was charged with 8.9 parts by weights of palladium dichloride, 4.1 parts by weight of anhydrous sodium acetate, 53 parts by weight of o-xylene and 80 parts by weight of anhydrous acetic acid. The mixture, while being stirred continuously, was heated for 10 hours at 100° C. Halfway during this period a quantity of 4.1 parts by weight of anhydrous sodium acetate was added to the mixture. Palladium formed and was filtered off. The filtrate was poured into 300 parts by weight of water. As a result, an organic top layer and an aqueous bottom layer were formed. After the layers had been separated, the bottom layer was shaken with 63 parts by weight of pentane, the extract being added to the organic top layer. The mixture thus obtained was washed three times, successively with 100 parts of water, 100 parts by weight of 5% NaOH solution in water and again with 100 parts by weight of water. After drying with anhydrous sodium sulfate the washed organic layer was distilled at reduced pressure. As a result, a fraction was obtained boiling at 100–125° C. and 0.05 mm. mercury pressure. This product, which consisted of 3,3',4,4'-tetramethyldiphenyl, was recrystallized from methanol. The isolated purified product constituted 5 parts by weight, corresponding to 51% m., calculated on converted palladium dichloride.

Example II

Using the same quantities of starting materials as in the previous example, an experiment was performed under identical conditions, but with the passage of 4 parts by weight of oxygen per hour through the mixture during heating.

The yield of 3,3',4,4'-tetramethyldiphenyl was 6.1 parts by weight, while in addition another 0.7 part by weight was isolated from the other fractions.

Together, this corresponds with a yield of 74% m., calculated on palladium dichloride.

Example III

To a solution of 8 grams of anhydrous sodium acetate in 80 grams of acetic acid, 20 grams of benzene and 3.6 grams of palladium dichloride was added. The mixture was then boiled with stirring for five hours, during which a precipitate of metallic palladium formed. After this precipitate, which weighed 2.1 grams, had been removed by filtration, the filtrate was diluted with 200 ml. of water. As a result, the mixture separated into two layers. The organic top layer, which contained diphenyl and unconverted benzene, was first washed with water and then with dilute alkali.

Then the benzene was distilled off. The yield of diphenyl was 2.3 grams, corresponding with 75% m., calculated on converted palladium dichloride. The product obtained was purified by recrystallization from ethanol.

Example IV

A mixture of 8.9 parts by weight of palladium dichloride, 4.1 parts by weight of anhydrous sodium acetate, 60 parts by weight of cumene and 80 parts by weight of anhydrous acetic acid was heated, with stirring, for ten hours at a temperature of 100° C. Halfway through the heating period a quantity of 4.1 parts by weight of anhydrous sodium acetate was added to the mixture. A palladium precipitate was formed. This was filtered off, after which the filtrate was poured into 300 parts by weight of water. The two layers of liquid then formed were separated, the bottom layer, the aqueous one, being shaken out with 63 parts by weight of pentane. The extract was added to the top layer, the organic one. The mixture thus obtained was washed three times, namely with 100 parts by weight of water, 100 parts by weight of 5% NaOH solution in water and again with 100 parts by weight of water.

After drying with anhydrous sodium sulfate, the washed organic layer was distilled. As a result, a fraction was obtained consisting of a mixture of isomeric diisopropyldiphenyl compounds having a boiling range of 100–120° C. at 0.05 mm. mercury pressure.

The yield was 8.1 parts by weight, corresponding with 81% m. calculated on converted palladium chloride.

Example V

In a reaction vessel, 30 grams of beta-phenyl-beta,beta-dimethylpropionic methyl ester was mixed with 5.6 grams of $PdCl_2$, 4.0 grams of NaCl, 10.3 grams of sodium acetate and 150 grams of acetic acid. The mixture was boiled, with stirring, for ten hours under a reflux condenser. As a result, a metallic palladium precipitate was formed, which was removed by filtration. Its quantity was 3.3 grams, i.e., 97% m. calculated on original quantity of $PdCl_2$.

The filtrate was diluted with 300 ml. of water and twice extracted with ether, each time with a quantity of 100 ml. The ether extracts were combined, washed with a saturated solution of sodium bicarbonate and dried with $MgSO_4$. Subsequently, the ether was distilled off, 27.5 grams of residue being obtained, of which 20 grams consisted of unconverted methyl ester.

From the residue a product was isolated with a boiling range of 195–225° C. at 0.05 mm. mercury pressure and with a saponification equivalent of 197 (for the dimeric product a saponification equivalent of 191 was calculated).

The yield was 5.4 grams, which corresponds with 46.2% m. calculated on converted $PdCl_2$ and with 54% m. calculated on converted methyl ester.

We claim as our invention:

1. The process for the intermolecular condensation of aromatic compounds, which comprises contacting an aromatic compound having a labile hydrogen atom attached to an aromatic nucleus, in liquid phase, with a salt selected from the group consisting of the salts of the palladium and platinum group metals with an acid selected from the group consisting of mineral acids, aliphatic monocarboxylic acids and sulfonic acids, under substantially anhydrous conditions, at a temperature of from about 40 to about 200° C., in the presence of a member of the group consisting of the oxides and salts of the alkali metals and alkaline earth metals.

2. The process in accordance with claim 1 wherein said member of the group consisting of the oxides and salts of the alkali metals and alkaline earth metals is a salt of a monocarboxylic acid.

3. The process in accordance with claim 1 wherein said salt of the palladium and platinum group metals is palladium dichloride.

4. The process in accordance with claim 1 wherein said reaction is carried out in the presence of an added molecular oxygen-containing gas.

5. The process for intermolecular condensation of aromatic hydrocarbons which comprises reacting an aromatic hydrocarbon having a labile hydrogen attached to an aromatic nucleus with a mixture consisting essentially of palladium dichloride, a carboxylic acid and a carboxylic acid salt of an alkali metal, at substantially anhydrous conditions, at a temperature of from about 40 to about 200° C.

6. The process in accordance with claim 5 wherein said carboxylic acid is acetic acid and said carboxylic salt of an alkali metal is sodium acetate.

7. The process for the production of a member of the group consisting of diphenyl and alkyl substituted diphenyl which comprises coupling a member of the group consisting of benzene and alkyl substituted benzene by contact in liquid phase with a salt selected from the group consisting of the salts of the palladium and platinum group metals with an acid selected from the group consisting of mineral acids, aliphatic monocarboxylic acids and sulfonic acids, under substantially anhydrous conditions, at a temperature of from about 40 to about 200° C., in the presence of a member of the group consisting of the oxides and salts of the alkali metals and the alkaline earth metals.

8. The process in accordance with claim 7 wherein said member of the group consisting of the oxides and salts of the alkali metals and the alkaline earth metals is an alkali metal carboxylate.

9. The process in accordance with claim 7 wherein said salt of the palladium and platinum group metals is palladium dichloride.

10. The process for the production of diphenyl which comprises reacting benzene, in liquid phase, with a mixture consisting essentially of palladium dichloride, acetic acid and sodium acetate, under substantially anhydrous conditions, at a temperature of from about 40 to about 200° C.

11. The process for the production of tetramethyldiphenyl which comprises reacting xylene, in liquid phase, with a mixture consisting essentially of palladium dichloride, acetic acid and sodium acetate, under substantially anhydrous conditions, at a temperature of from about 40 to about 200° C.

12. The process for the production of diisopropyldiphenyl which comprises reacting cumene, in liquid phase, with a mixture consisting essentially of palladium dichloride, acetic acid and sodium acetate, under substantially anhydrous conditions, at a temperature of from about 40 to about 200° C.

References Cited in the file of this patent

UNITED STATES PATENTS

| | | |
|---|---|---|
| 2,960,550 | Feller et al. | Nov. 15, 1960 |
| 2,960,551 | Feller | Nov. 15, 1960 |